US007969998B2

(12) United States Patent
Kanakasapapathi et al.

(10) Patent No.: US 7,969,998 B2
(45) Date of Patent: Jun. 28, 2011

(54) METHOD AND SYSTEM FOR TUNNELING DATA USING A MANAGEMENT PROTOCOL

(75) Inventors: Krishna Kanakasapapathi, Herndon, VA (US); Lee Alan Shombert, Herndon, VA (US); Stephen Daniel Darryl James, South Riding, VA (US); Alec Hothan, Sacramento, CA (US); Thomas Wesley Hoffman, Fairfax, VA (US); Jin Huai, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 1104 days.

(21) Appl. No.: 11/149,681

(22) Filed: Jun. 10, 2005

(65) Prior Publication Data
US 2006/0280175 A1 Dec. 14, 2006

(51) Int. Cl.
*H04L 12/16* (2006.01)
*H04L 12/28* (2006.01)
*H04L 12/56* (2006.01)
*H04Q 11/00* (2006.01)
*H04B 7/00* (2006.01)
*H04B 1/02* (2006.01)
*H04B 1/034* (2006.01)
*H04W 4/00* (2009.01)

(52) U.S. Cl. ............... 370/409; 370/262; 370/310.2; 370/328; 370/392; 370/395.2; 370/901; 370/908; 455/92; 455/95

(58) Field of Classification Search .......... 370/218, 370/228, 252, 352, 493; 709/203
See application file for complete search history.

(56) References Cited

U.S. PATENT DOCUMENTS

| 5,764,955 | A | 6/1998 | Doolan | |
|---|---|---|---|---|
| 6,888,798 | B2 * | 5/2005 | Jamieson et al. | 370/236 |
| 7,206,805 | B1 * | 4/2007 | McLaughlin, Jr. | 709/203 |
| 7,486,695 | B1 * | 2/2009 | AbdelAziz et al. | 370/466 |
| 2002/0146016 | A1 * | 10/2002 | Liu et al. | 370/401 |
| 2003/0031125 | A1 * | 2/2003 | Oyamada | 370/218 |
| 2003/0169690 | A1 * | 9/2003 | Mott | 370/238 |
| 2005/0135346 | A1 * | 6/2005 | Oyamada et al. | 370/352 |

OTHER PUBLICATIONS

M. Leech et al., "SOCKS Protocol Version 5", RFC 1928, IETF, Mar. 1996.

* cited by examiner

*Primary Examiner* — Pankaj Kumar
*Assistant Examiner* — Lonnie Sweet
(74) *Attorney, Agent, or Firm* — Cindy Kaplan

(57) ABSTRACT

A method and system for providing network management communication between a plurality of network elements are disclosed. A method includes creating a tunnel configured for transmitting data between the network elements and transmitting network management information over the tunnel using a network management protocol. The tunnel passes through a gateway network element configured to communicate with the network elements utilizing the network management protocol.

21 Claims, 20 Drawing Sheets

METHOD AND SYSTEM FOR TUNNELING DATA USING A MANAGEMENT PROTOCOL

BACKGROUND OF THE INVENTION

The present invention relates generally to communication networks, and more specifically, to a method and system for creating tunnels for use in transferring data over a management protocol, such as Transaction Language 1 (TL1).

TL1 is a widely used management protocol in telecommunications. It is a cross-vendor, cross-technology man-machine language, and is widely used to manage optical (SONET) and broadband access infrastructure in North America. TL1's widespread acceptance is due in large part to its being easy to use and easy to understand. TL1 allows a service provider to connect directly to a vendor's network elements using non-vendor network management systems. In addition, TL1 has all the built-in functionality needed to manage every aspect of today's increasingly complex network elements. TL1 is defined by Bellcore GR-831-CORE document "Operations Application Messages—Language for Operations Application Messages".

Most management software systems are TCP/IP based. For example HP OpenView is an SNMP based system which uses TCP/IP. Cisco Transport Controller (CTC) is also a TCP/IP based system. In an optical network, OSI (Open Systems Interconnection) is the protocol used to exchange management data between network elements (NEs). Network elements may rely on management software, such as CTC, for management functions. However, if the network element is deployed behind a competitor product and if the competitor product does not communicate nor route TCP/IP between the network elements, then it shuts out manageability of the network element through the management software. However, these network elements still allow management via TL1.

There is, therefore, a need for a method and system for allowing a management application to access a network element that is not accessible to the management application via the typical management route, by tunneling over a management protocol.

SUMMARY OF THE INVENTION

A method and system for providing network management communication between a plurality of network elements are disclosed. A method includes creating a tunnel configured for transmitting data between the network elements and transmitting network management information over the tunnel using a network management protocol. The tunnel passes through a gateway network element configured to communicate with the network elements utilizing the network management protocol.

In another aspect of the invention, a system is configured for transmitting network management information between a transport manager and a first network element communicating via a gateway network element. The network elements are configured to communicate utilizing a network management protocol. The system generally comprises a transport controller configured to create a tunnel having one end point at the transport manager and the other end point at the first network element. The tunnel passes through the gateway network element and has network management protocol connections at each end of the tunnel. The transport controller is operable to send IP packets over the tunnel utilizing the network management protocol.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. The network may be a SONET/SDH network and a network element may be a terminal multiplexer, an add-drop multiplexer (ADM), an optical cross-connect (OXC), a signal regenerator, router, switch, or other optical node interface, for example. The system and method described herein may be incorporated for use, for example, in an optical transport platform, such as ONS 15327, 15454, 15600, or 15310CL available from Cisco Systems, Inc.

A method and system of the present invention allow for the creation of tunnels for use in transferring data over a management protocol to provide IP connectivity. The following describes embodiments for providing access to an IP network across an OSI network through a gateway network element (GNE) that operates a Transaction Language 1 (TL1) Translation Device mediation function (TTD). It is to be understood that TL1 is only one example of a network element interface and that other connections may be used to tunnel traffic, without departing from the scope of the invention.

Figure 1A:
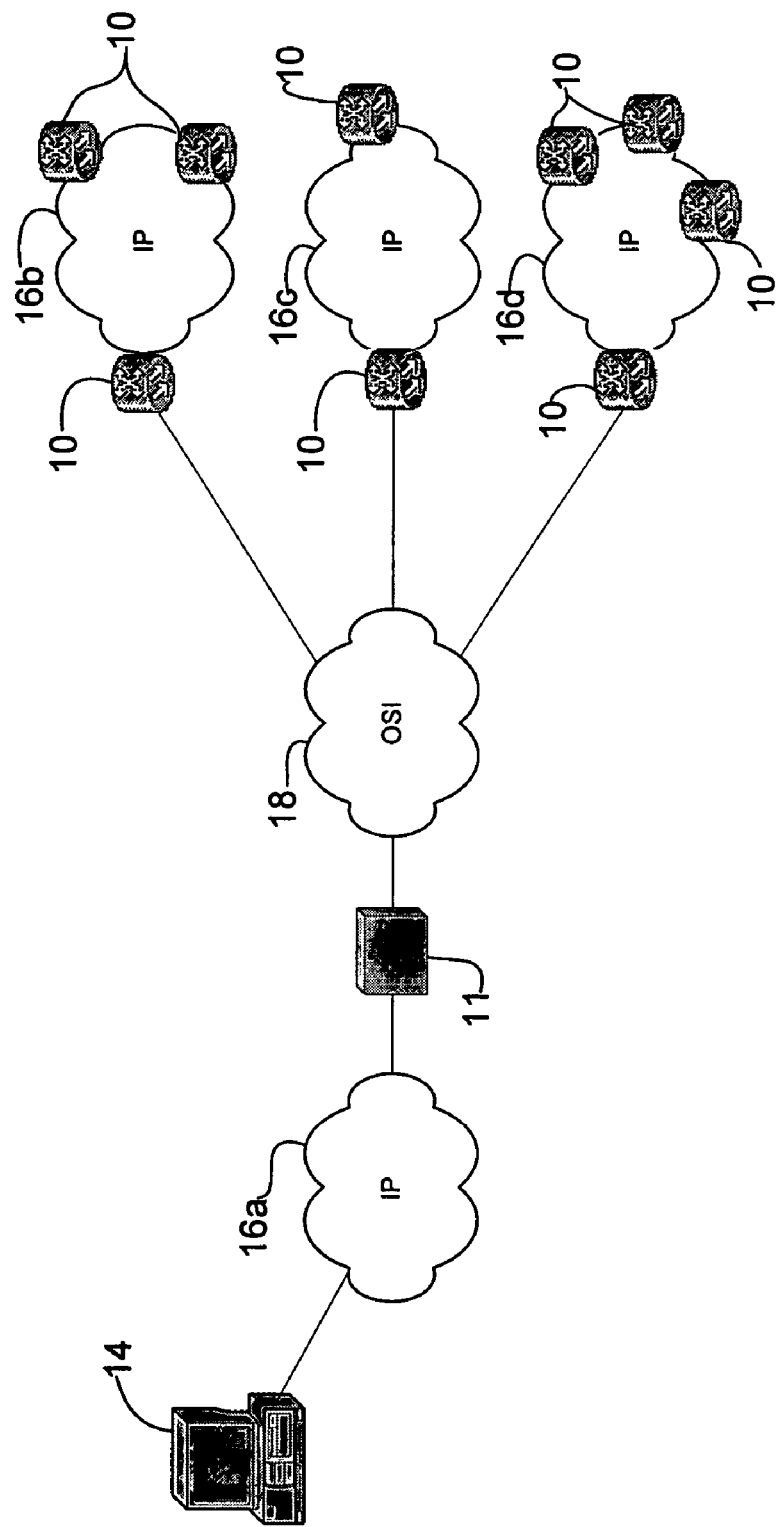
FIG. 1A illustrates an example of a network in which the present invention may be implemented.

Referring now to the drawings, and first to FIG. 1A, an example of a network that may use the method and system of the present invention is shown. The network may be, for example, a SONET network managed via one or more network management stations. The network may also be part of a larger SONET/SDH network. It is to be understood that the network shown in FIG. 1A is only one example and that the system and method disclosed herein may be used in various types of network configurations without departing from the scope of the invention.

The network shown in FIG. 1A includes nodes (also referred to as network elements or NEs) 10, 11 interconnected by links (spans). The network elements 10 are interconnected, for example, by optical fiber links which include an optical fiber cable or multiple cables connected serially, as is well known by those skilled in the art. The network shown in FIG. 1A includes a plurality of IP networks 16a, 16b, 16c, 16d separated by an OSI network 18.

A transport manager 14 runs on a computer connected to IP network 16a. The transport manager 14 may operate, for example, on a computerized element management system (EMS) and may be, for example, a Cisco Transport Manager (CTM). The transport manager 14 may be connected to the NE 11 by an Ethernet link or some other interface (e.g., serial port, wide area network, wireless connection, or other suitable interface). The transport manager 14 may run on a (user) computer such as a stand-alone desktop computer, laptop computer, or other suitable communication device. The computer may include, for example, a CTC (Cisco Transport Controller), available from Cisco, Systems, Inc. or other subnetwork interface tool that can be used for node control. The transport manager 14 may be implemented by object oriented software using CORBA (Common Object Request Broker Interface) or other appropriate software.

A network element interface, such as TL1, is used to manage network elements in communication with the transport manager 14. The TL1 network elements can serve as a gateway, end point, or intermediate node. A network element operates as a gateway NE (GNE) when TL1 commands destined to another NE can be forwarded through the GNE. An end point NE (ENE) processes TL1 commands addressed to it and an intermediate NE simply acts as a conveyor of TL1 messages. In the example shown in FIG. 1A, network element 11 operates as a GNE and network elements 10 operate as ENEs. It is to be understood that the term gateway network element as used herein, refers to any network element that forwards management protocol commands to other network elements.

Figure 1B:
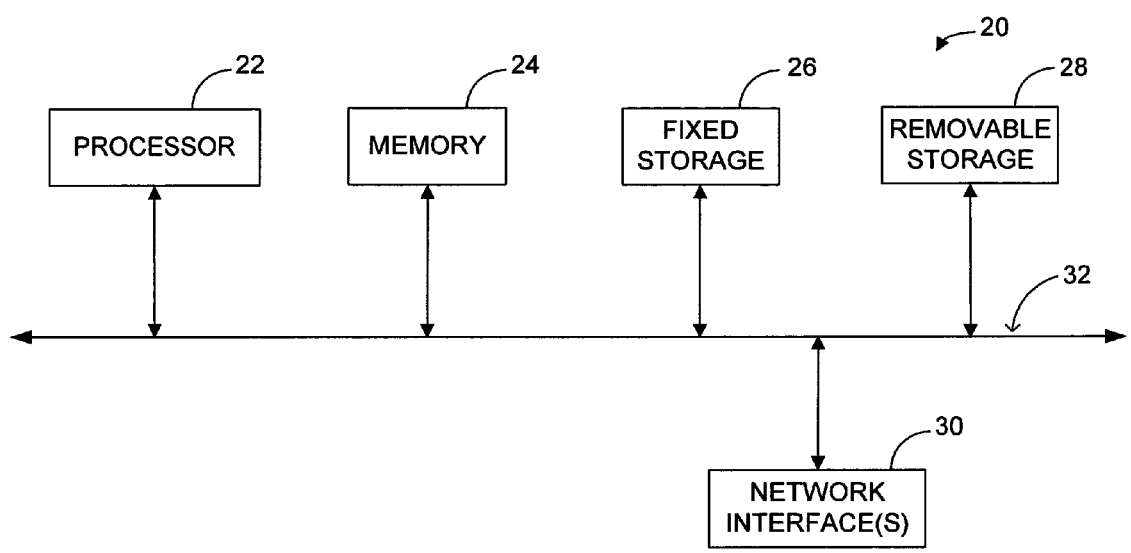
FIG. 1B is a system block diagram of a computer system that can be utilized to execute software of an embodiment of the present invention.

The NEs 10, 11 and transport manager 14 include a processor and memory and may be implemented on a computer system such as described with respect to FIG. 1B, for example. FIG. 1B shows a system block diagram of computer system 20 that may be used to execute software of an embodiment of the invention. The computer system 20 includes memory 24 which can be utilized to store and retrieve software programs incorporating computer code that implements aspects of the invention, data for use with the invention, and the like. Exemplary computer readable storage media include non-transitory media such as CD-ROM, floppy disk, tape, flash memory, system memory, and hard drive. Computer system 20 further includes subsystems such as a central processor 22, fixed storage 26 (e.g., hard drive), removable storage 28 (e.g., CD-ROM drive), and one or more network interfaces 30. Other computer systems suitable for use with the invention may include additional or fewer subsystems. For example, computer system 20 may include more than one processor 22 (i.e., a multi-processor system) or a cache memory. The computer system 20 may also include a display, keyboard, and mouse (not shown) for use as a host.

The system bus architecture of computer system 20 is represented by arrows 32 in FIG. 1B. However, these arrows are only illustrative of one possible interconnection scheme serving to link the subsystems. For example, a local bus may be utilized to connect the central processor 22 to the system memory 24. Computer system 20 shown in FIG. 1B is only one example of a computer system suitable for use with the invention. Other computer architectures having different configurations of subsystems may also be utilized. Communication between computers within the network is made possible with the use of communication protocols, which govern how computers exchange information over a network, as is well known by those skilled in the art.

Figure 2:
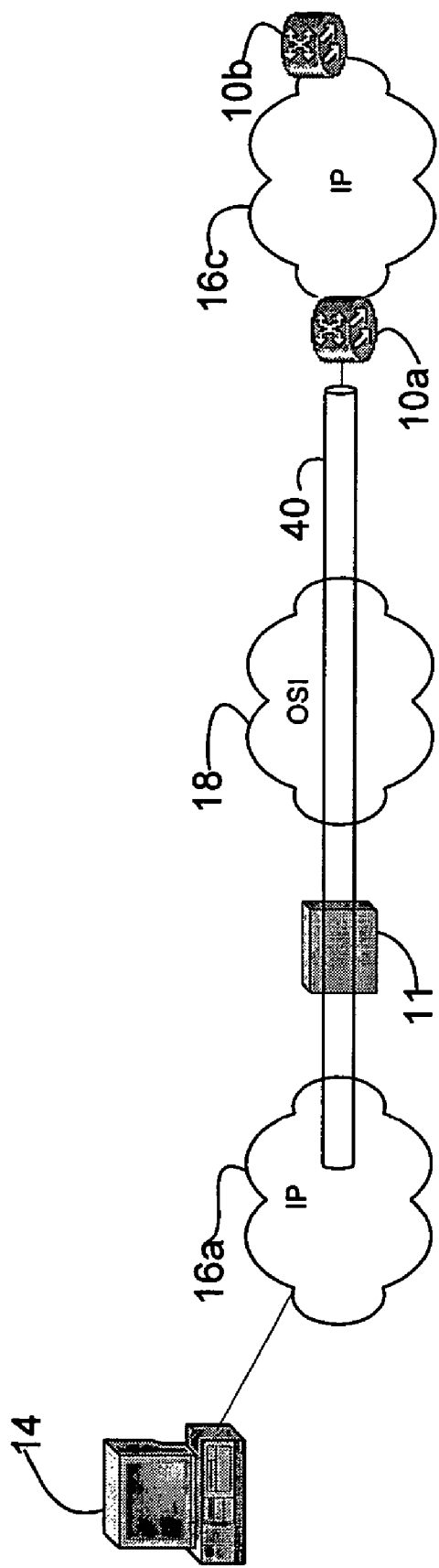
FIG. 2 illustrates a tunnel used to transfer management data over a network.

As discussed above, the present invention allows IP traffic to pass over the OSI network 18 using tunnels. FIG. 2 illustrates a tunnel 40 setup to connect management IP network 16a to NE IP network 16c across OSI network 18. The ENE that services the tunnel end point is referred to as a PNE (Proxy Network Element) 10a to distinguish it from the GNE 11 and ENE 10b, which are not located at an end point of the tunnel 40. Only one tunnel 40 is shown for simplification, however, it is to be understood that multiple tunnels may be created to connect a management IP network to a plurality of NE IP networks.

As described in detail below, different types of tunnels 40 may be used to connect the IP networks 16a, 16c. The first type of tunnel is referred to as Socket over TL1 (SoTL1). The tunneling layer is the transport layer (layer 4 of the OSI reference model). The second type of tunnel is IP over TL1 (IPoTL1). The tunneling layer used is layer 3. The third type of tunnel is GIOP over TL1 (GIOPoTL1) which operates at the application layer (layer 7).

Socket Over TL1

Socket over TL1 is a protocol that works similar to RMI (Remote Method Invocation) or CORBA applied to the socket interface. The socket interface on the PNE 10a is made remote across a TL1 connection to a peer tunnel end point (location on transport manager 14 side). The network is preferably TTD enabled and configured for IP over LAN. The network may include subtended rings with ENEs, with the front NE (PNE 10a) connected to the GNE 11 using OSI/LAPD/SDCC and the NEs 10a, 10b operating OSI+IP over PPP/LDCC, for example.

Figure 3:
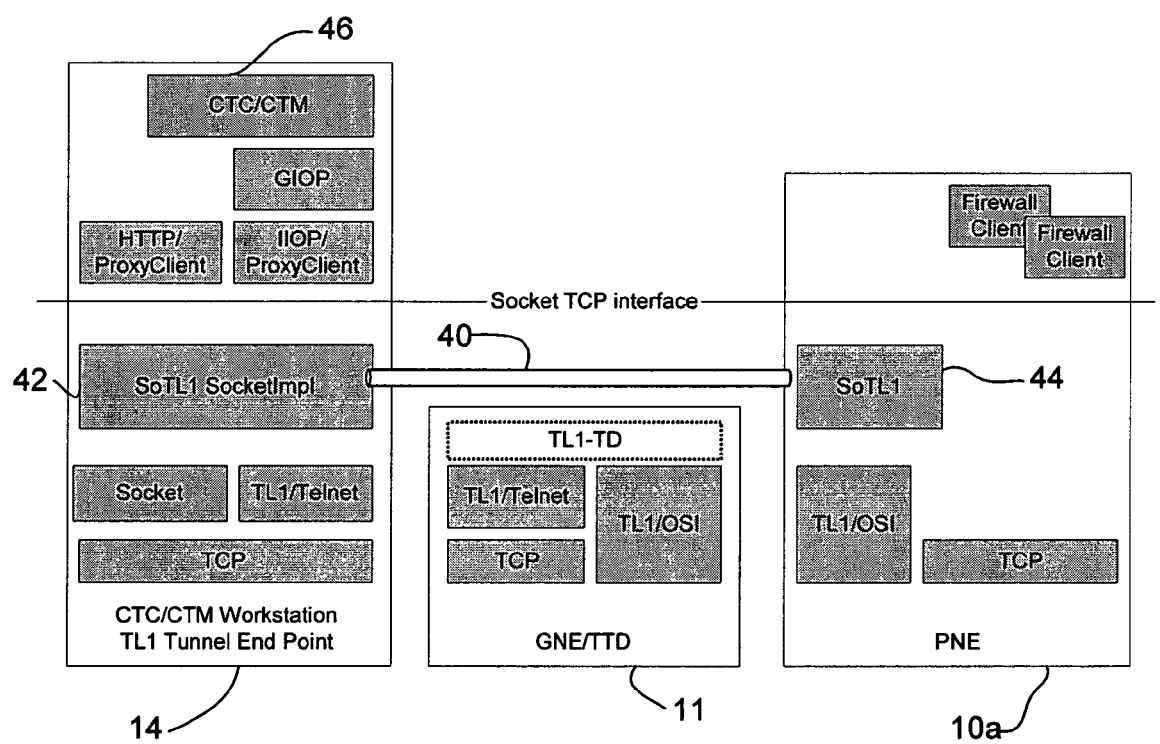
FIG. 3 illustrates the functional structure of Socket over TL1.

FIG. 3 illustrates the functional structure of Socket over TL1. The tunnel 40 and socket TCP interface is shown over the GNE 11. At one end point of the TL1 tunnel 40 is the transport manager 14 and socket interface 42. At the other end point of the tunnel 40 is the PNE 10a and socket interface 44. The tunnel 40 is managed from a transport controller (e.g., CTC 46), as described below.

In one embodiment, the SoTL1 protocol uses PDUs (Protocol Data Units) defined by SSH (Secure Shell) protocol (see, "SSH Protocol Architecture" (draft-ietf-secsh-architecture-22.txt, T. Ylonen et al., Mar. 14, 2005), which is incorporated herein by reference in its entirety). Similar to SSH, SoTL1 supports the remoting (forwarding) of TCP connections and multiplexing of several byte streams (channel) on top of a single transport connection. Instead of using TCP connections as a transport mechanism, SoTL1 uses the TL1 connection. Also, as described below, independent flow control is provided for each channel. It is to be understood that a different encoding of PDUs may be used, without departing from the scope of the invention.

For security reasons, preferably only the transport manager side is allowed to open channels. Multiple channels are multiplexed into a single connection. Channels are identified by numbers at each end. Requests to open a channel contain the sender's channel number. Any other channel-related messages contain the recipient's channel number for the channel. Channels are flow-controlled so that no data can be sent to a channel until a message is received to indicate that window space is available. Since several TCP connections can be multiplexed into the same TL1 connection, each TCP stream is tagged. Each connection/channel is identified, for example, by a pair of 32-bit tags.

Connections from PNE 10a to transport manager 14 are preferably handled in a more secure manner, using for example the SOCKS protocol, as defined in RFC 1928—SOCKS Protocol Version 5 (M. Leech et al., March 1996). SOCKS allows reveres connections to be established using SOCKS proxies and guarantees that only reverse connections authorized by the client can be established.

The socket service that needs to be remoted includes: Connection (IP address); Close; Write (data, length); and Read (data). A new TL1 command is used to carry the encapsulated PDUs (Protocol Data Units) from the transport manager 14 to the PNE 10a and a new reply message is used to carry the PDUs in the other direction. The PDUs are preferably encoded using base64 since the TL1 messages do not allow binary content.

Figure 4:
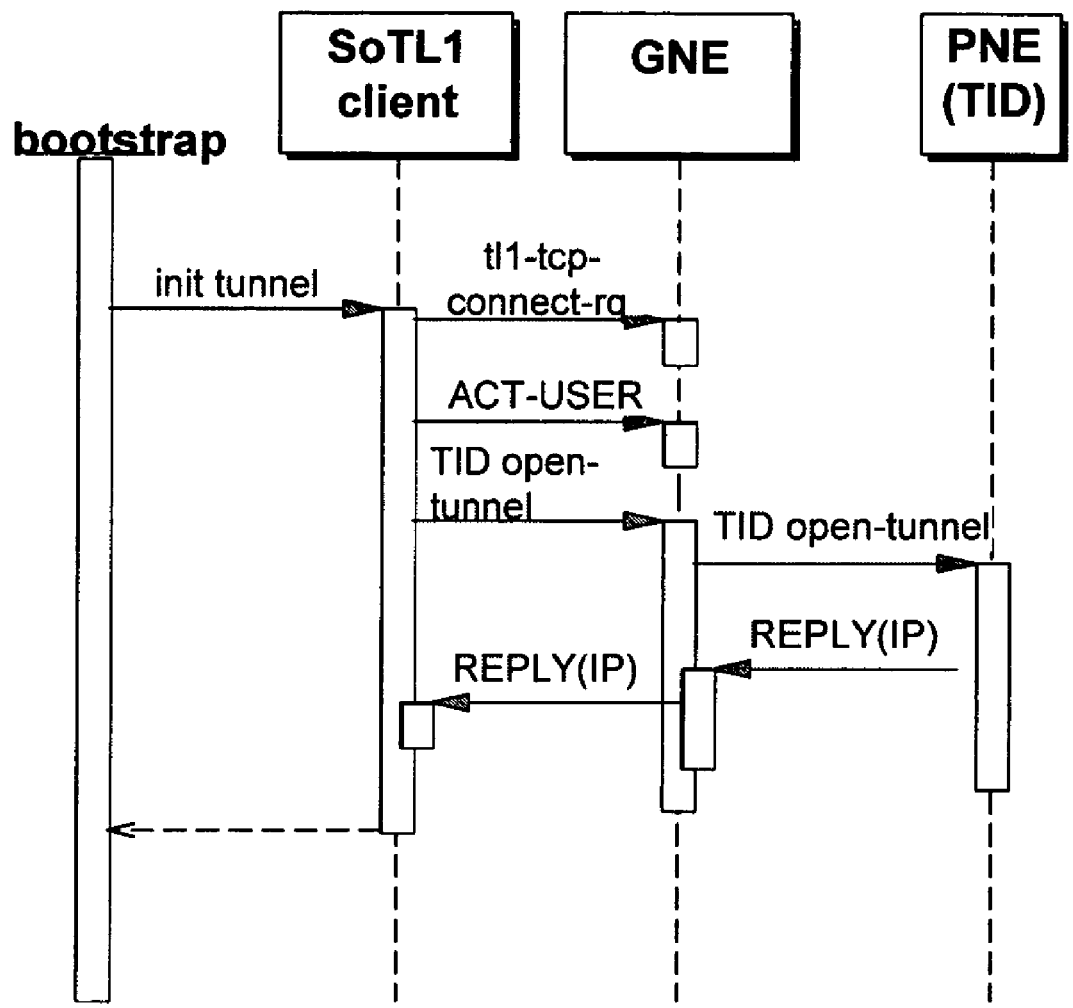
FIG. 4 illustrates tunnel initialization for Socket over TL1.

FIG. 4 illustrates one example of tunnel initialization. The initial handshake is between the GNE 11 and the PNE 10a and establishes the TL1 tunnel 40. The parameters transmitted during the handshake include: GNE IP address (or DNS name); GNE user name/password (if required by the GNE to activate the TTD); PNE TID; and PNE user name/password (optional). Upon completion of the handshake, the TL1 tunnel is open and the workstation SoTL1 end point knows the IP address of the PNE. It is to be understood that other modes of handshakes may be used without departing from the scope of the invention.

Figure 5:
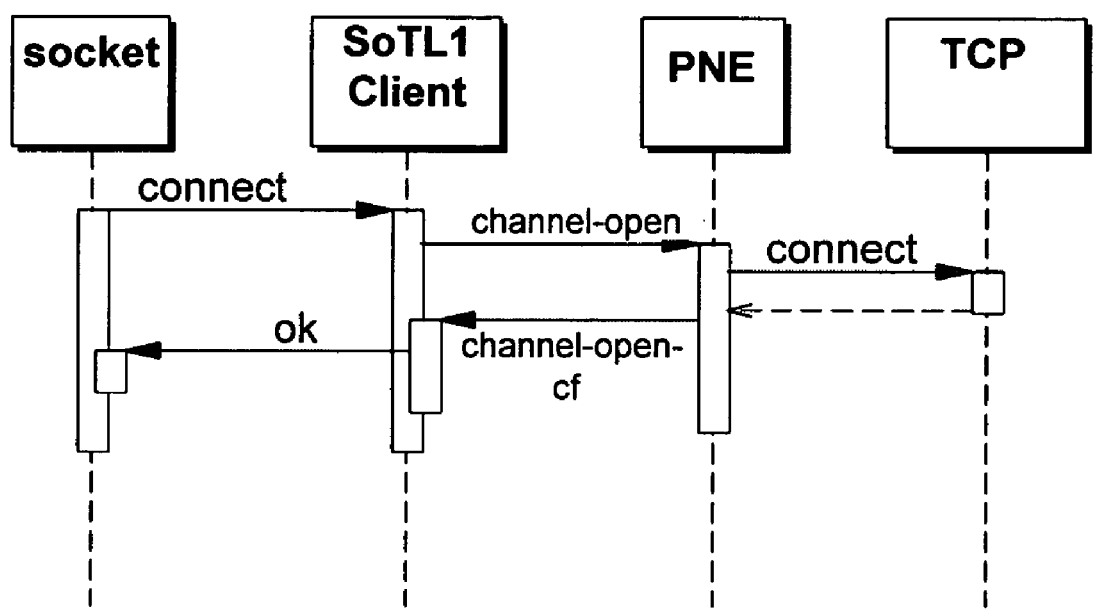
FIG. 5 illustrates messages transmitted to open a channel for Socket over TL1.

FIG. 5 illustrates a socket connect process. A CHANNEL-OPEN (dest IP, dest port, initial window size) PDU is used to forward a connect request to the PNE 10a. When the transport manager 14 wants to open a new channel, it allocates a local number for the channel. A message is sent to the remote side and includes channel number in the message. The remote side then decides whether it can open the channel. A response is returned using a CHANNEL-OPEN-CF PDU or an OPEN-CHANNEL-FAIL PDU.

Figure 6:
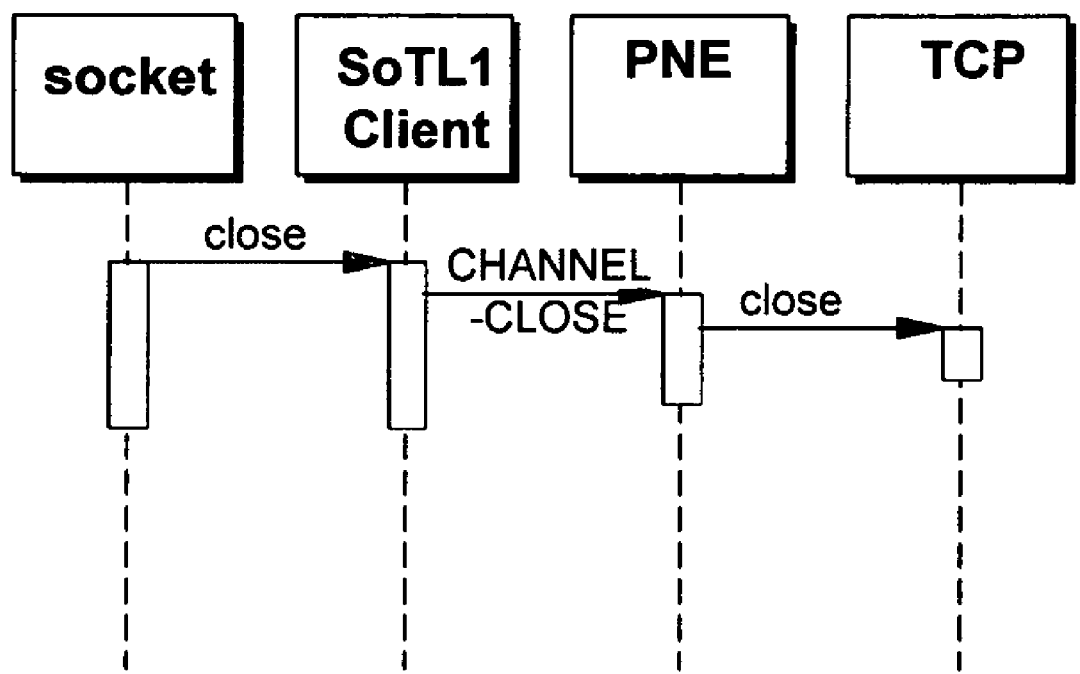
FIG. 6 illustrates messages transmitted to close a channel for Socket over TL1.

FIG. 6 illustrates a socket close process. The reconnection can be closed from any tunnel end. A CHANNEL-CLOSE PDU is used for this purpose. The PDU is not subject to the transmission window/flow control, described below. When a party no longer needs to send more data to a channel, it sends a close message. No explicit response is required for this message.

Figure 7:
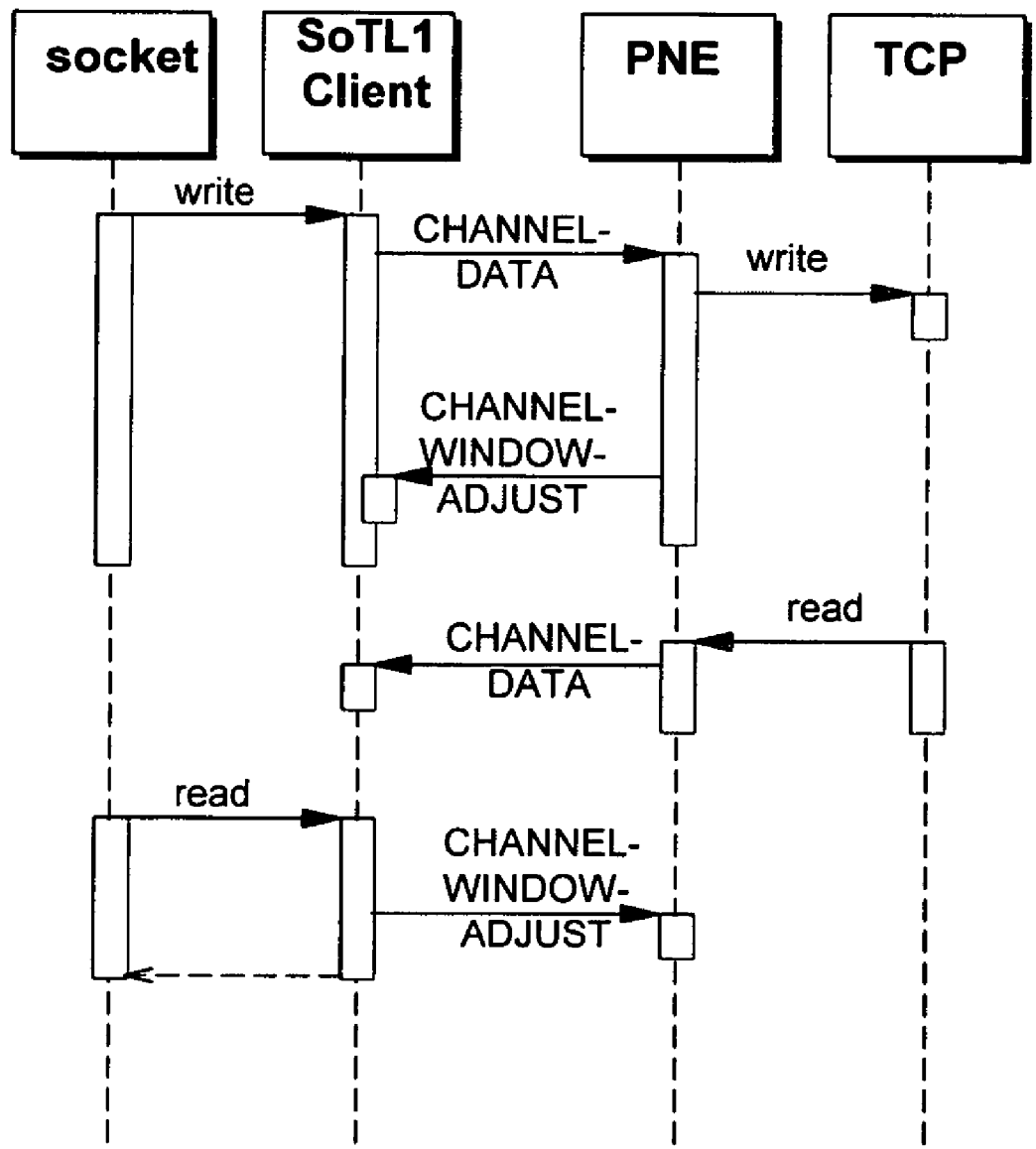
FIG. 7 illustrates data transfer and flow control for Socket over TL1.

Data transfer and flow control is performed as shown in FIG. 7. For each channel, the two directions of data transfer are independent with their own flow control mechanisms. Data is forwarded both ways using a CHANNEL-DATA PDU when the window is open. Flow control is regulated by a transmission window (one in each direction) through a CHANNEL-WINDOW-ADJUST(size) PDU. This PDU contains the credit (in bytes) and is sent by the receiving side of the tunnel. On the PNE side, the receiving window is tightly coupled with the actual socket outgoing flow control. On the SoTL1 client side, the receiving window is tightly coupled with the amount of data buffered locally (not yet read by the local user).

Figure 8:
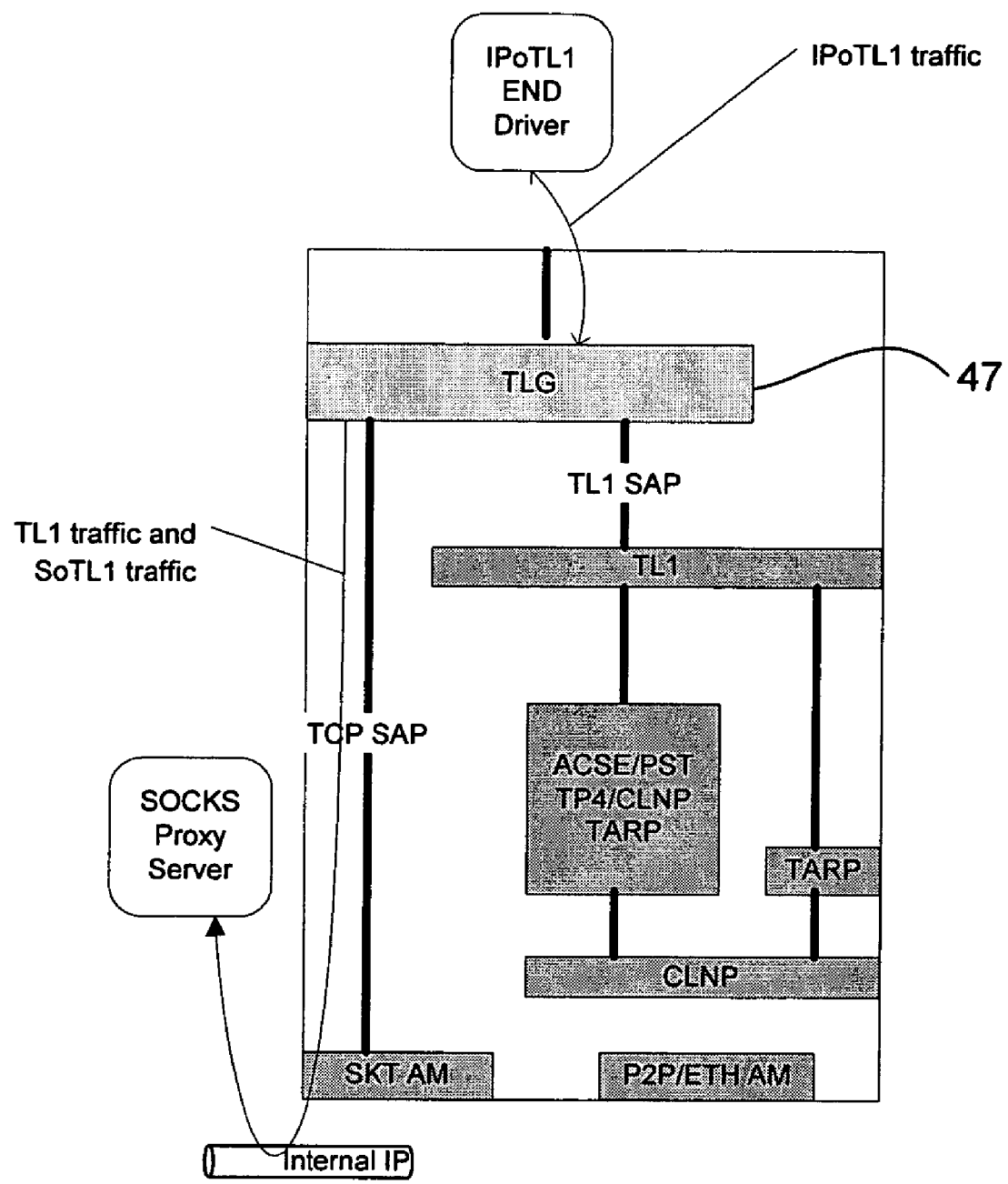
FIG. 8 illustrates a PNE tunnel end point and Socket over TL1 traffic at the PNE tunnel end point.

FIG. 8 illustrates implementation of the tunnel 40 on the PNE end point. The end point may be implemented inside an entity referred to as TLG (TL1 Gateway entity) 47 that operates over the ACSE/presentation layer). The TLG entity 47 receives all incoming TL1 traffic from the OSI network and can process and dispatch the traffic according to its content. Since tunneled socket connections are initiated locally from the point of view of the PNE firewall infrastructure, all TCP connections coming from the OSI stack (including SoTL1 forwarded sockets and regular TL1 connections) are marked with a particular IP loopback address that is considered an external IP address by the firewall code.

Figure 9:
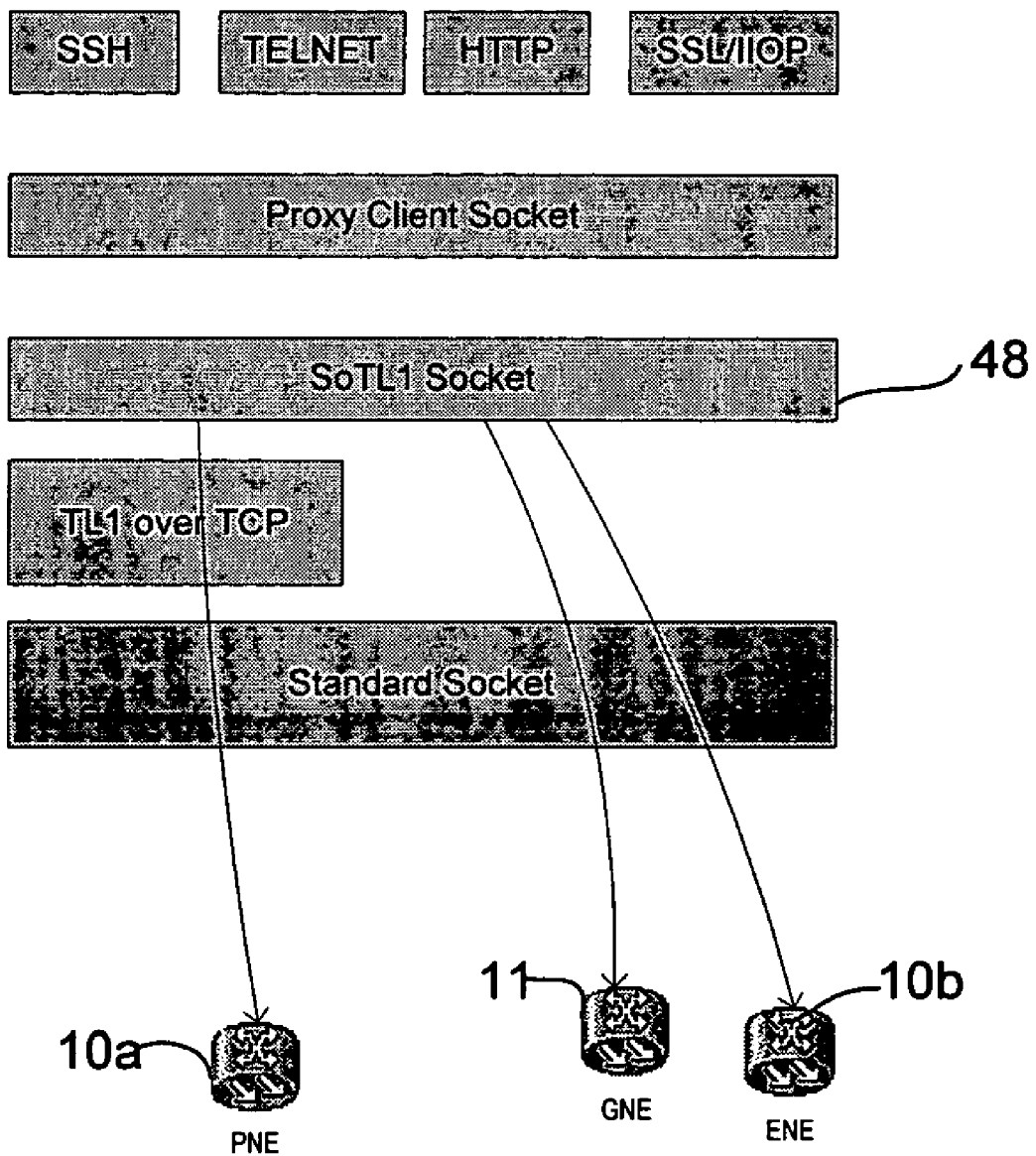
FIG. 9 illustrates a CTC tunnel end point and Socket over TL1 traffic at the CTC tunnel end point.

FIG. 9 illustrates the transport manager tunnel end point. The transport manager side of the tunnel end point includes a SoTL1 socket class 48. The socket class 48 implements the socket interface and is in charge of directing traffic to a tunnel end point or to a standard socket based on the destination IP address. The class is configured to manage multiple sockets and tunnels. The SoTL1 socket is used by all socket related components inside the transport controller, including Telnet and SSH, HTTP, JacORB and its SSL sockets.

Figure 10:
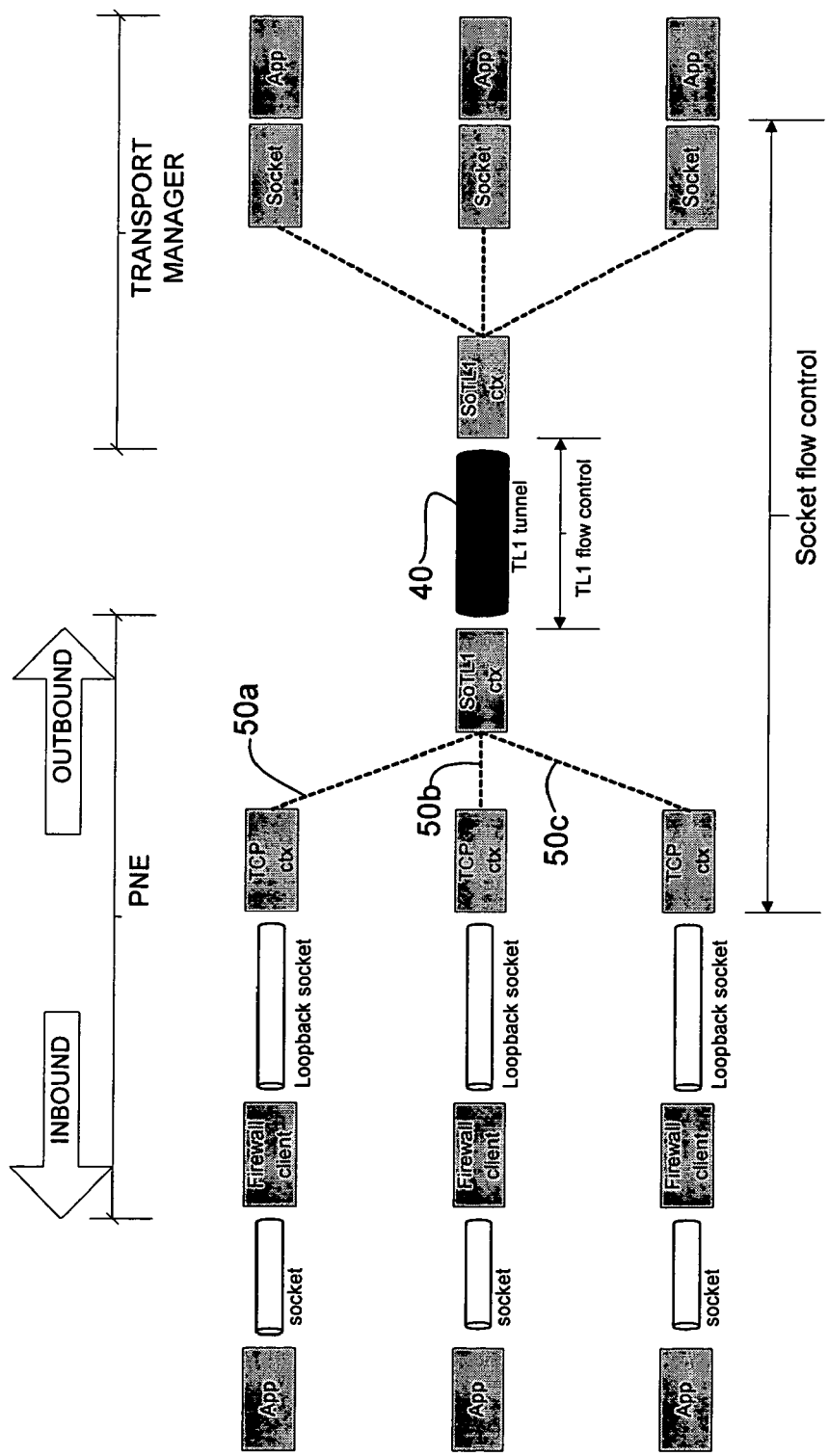
FIG. 10 illustrates an overview of flow control for Socket over TL1.

FIG. 10 illustrates an overview of flow control for SoTL1. The TL1 tunnel 40 is shown with three multiplexed channels (50a, 50b, 50c). One bottleneck is the GNE 11 and the TL1 tunnel itself. Inbound traffic is shown from the transport manager 14 to the PNE 10a and outbound traffic is the reverse direction. If base64 encoding is used, the effective aggregated throughput shared by all multiplexed sockets for the TL1 tunnel 40 is about (and at most) 18 Kbytes/s.

In accordance with the TL1 standard, the maximum size of each TL1 request or reply is 4096 bytes. In order to allow for a fair sharing of the tunnel and to privilege transaction type messages, the maximum size of TL1 messages used for the tunneling is preferably limited to 200 bytes or less both ways. This results in an effective MTU (Maximum Transmission Unit) of about 1500 bytes. In one embodiment, the TCP payload is limited to chunks no larger than 1200 bytes (before base64 encoding).

Figure 11:
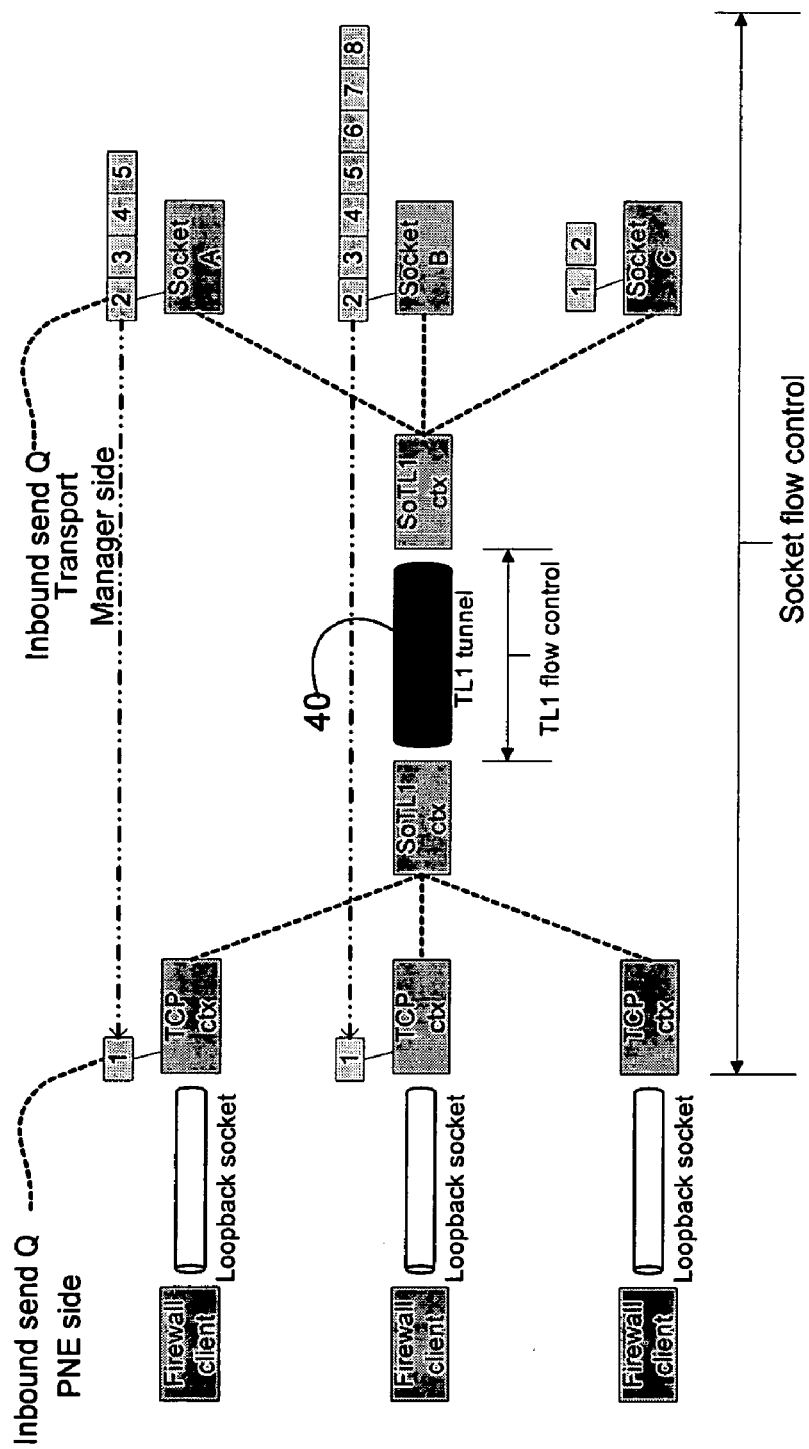
FIG. 11 illustrates a channel transmit window for Socket over TL1.

FIG. 11 illustrates a channel transmit window. The role of the channel transmit window is to limit the number of buffered data for each channel inside a given tunnel 40 and optimize the average throughput for each channel. The channel transmit window is expressed in bytes (since the TCP socket payload is an unbounded byte stream). FIG. 11 illustrates a typical state where the TL1 tunnel 40 is the bottleneck for inbound traffic. Buffered data tends to accumulate before the tunnel, while data that is past the tunnel is relatively quickly forwarded to its destination socket. The transmission window for SoTL1 may be arbitrarily set to any value that is compatible with the transport level throughput (it cannot be too large to avoid retransmissions of layer 3 packets by the transport layer). A transmission window of 4 KB, for example, takes 0.2 seconds to transfer under optimum conditions (assuming an SDCC throughput of 24 KBytes/second).

When the buffered data for a given channel reaches the transmit window size, the source stops sending more data until the buffered data gets processed past the tunnel. On the PNE side this may be achieved by directly mapping the actual socket flow control on the SoTL1 flow control. On the transport manager side, this may be achieved by blocking the sending thread when the transmit window is full, and unblocking it when it is no longer full.

The receiving end of the tunnel 40 signals to the other end of the tunnel how many more bytes can be sent using a specific WINDOW-ADJUST PDU that contains the number of bytes processed. To prevent unnecessary overhead (i.e., too many WINDOW-ADJUST PDUs which represent non payload traffic), it is preferred to only send back WINDOW-ADJUST PDUs when half of the transmit window is reached.

Figure 12:
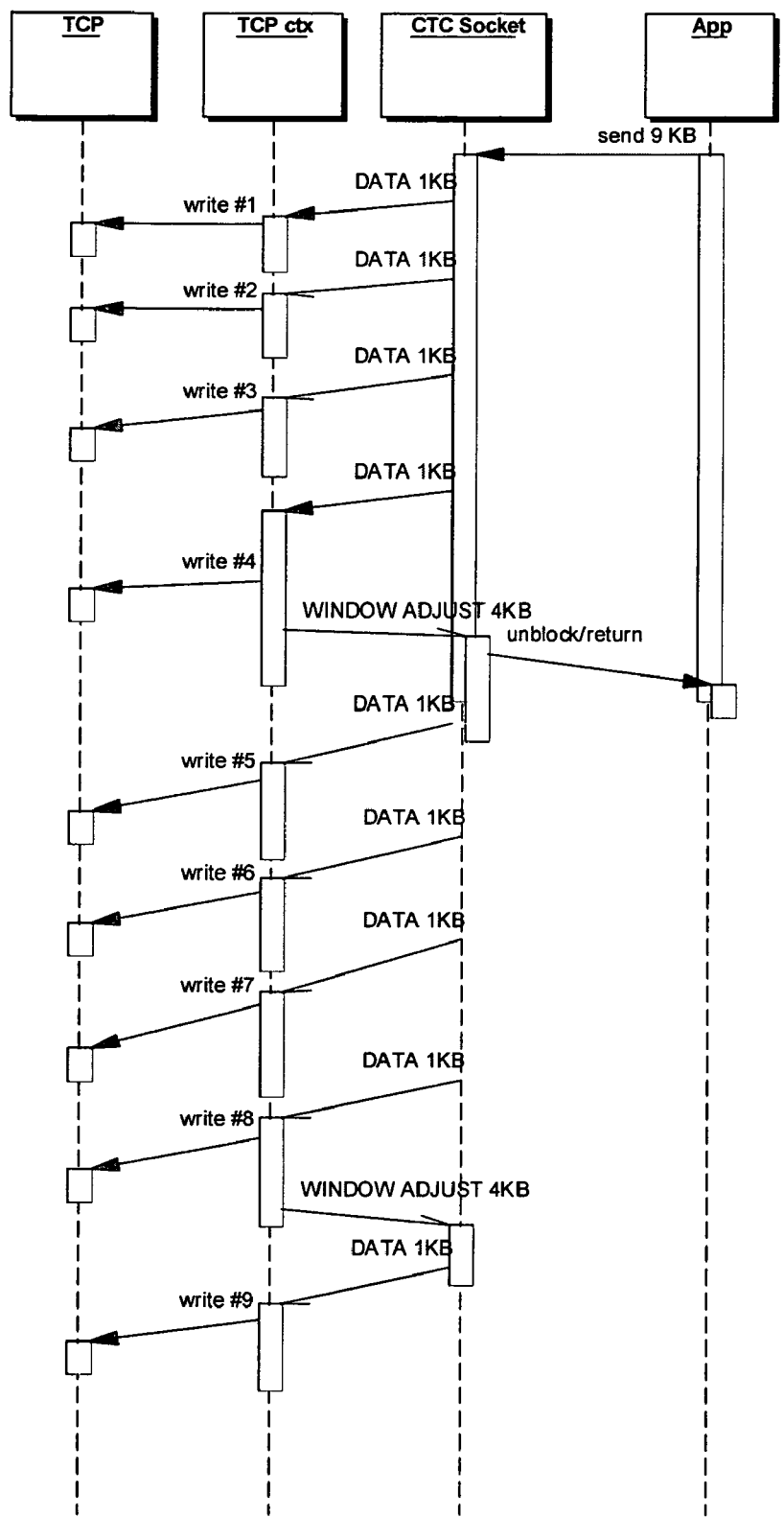
FIG. 12 illustrates end-to-end flow control for Socket over TL1.

FIG. 12 illustrates an example of end-to-end flow control. The application on the transport manager 14 side (right side as viewed in FIG. 12) sends a 9KB buffer. Because the transmit window is 8 KB, the application (the thread invoking the write method on the socket) is blocked until the recipient indicates that it has processed enough data to make room in the transit window. The 9 KB buffer is then segmented in chunks of 1 KB (the MTU), encoded, and then sent into the TL1 tunnel. For the sake of simplicity, this sequence diagram assumes there are no interleaving chunks from other channels caused by a round robin algorithm.

On the PNE receiving end (left side as viewed in FIG. 12), the data chunks are read, decoded, and then sent to the destination socket. The receiving end will send back a WINDOW-ADJUST PDU to the workstation only when half of the transmit window (4 KB) has been processed, to notify that 4 KB were processed. Upon receipt of this WINDOW-ADJUST PDU, the sender unblocks the writing thread and resumes its forwarding of the remaining data. The writing thread is unblocked because the remaining unprocessed data is 5 KB at that time, which is well under the transmit window.

Figure 13:
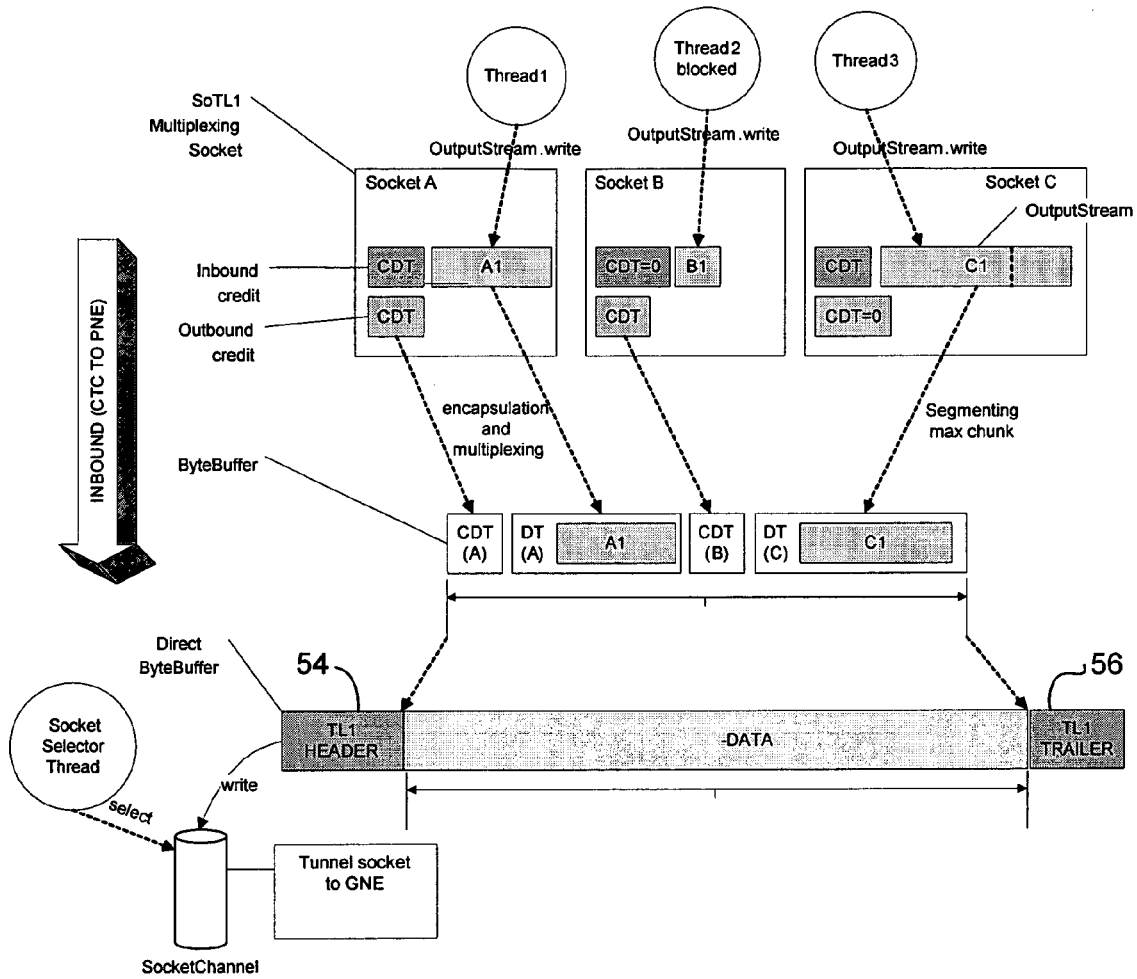
FIG. 13 illustrates multiplexing and encapsulation details for transfer of data from a transport manager to PNE.
Figure 14:
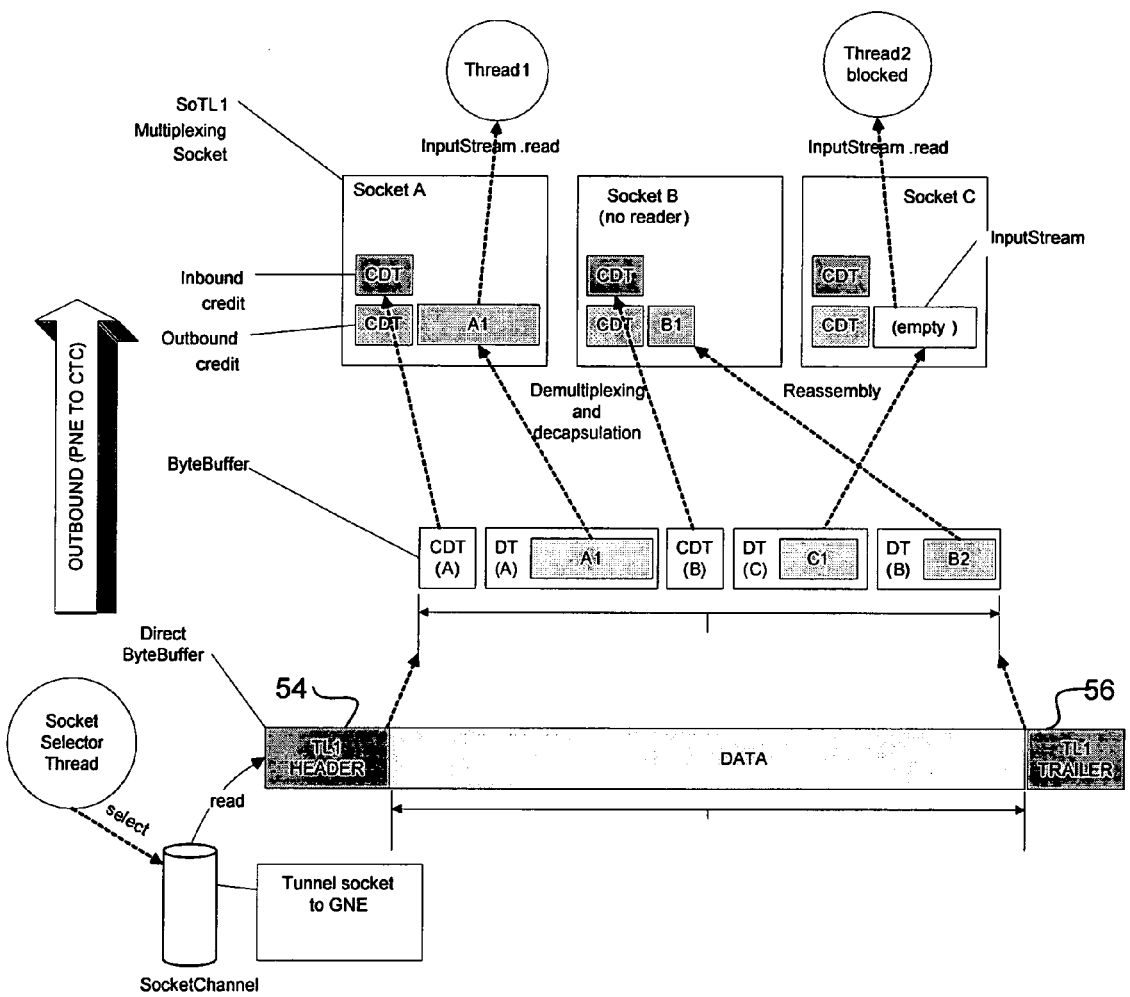
FIG. 14 illustrates multiplexing and encapsulation details for transfer of data from the PNE to the transport manager.

FIGS. 13 and 14 illustrate multiplexing and encapsulation details for data sent from the transport manager 14 to the PNE 10a, and data sent from the PNE to the transport manager, respectively. The base64 encoded data is encapsulated with a TL1 header 54 and TL1 trailer 56 at the transport manager 14. Inbound and outbound credits are inserted into the multiplexed data and the output stream is segmented as required, as discussed above (FIG. 13). Upon receiving the data, demultiplexing and decapsulation are performed and the data is reassembled (FIG. 14). It is to be understood that the process shown in FIGS. 13 and 14 is only one example and variations to the process may be made without departing from the scope of the invention.

The SoTL1 socket is preferably setup and initialized very early in the CTC bootstrap process (i.e., before the first HTTP request takes place). Since PNEs are not accessible before the tunnel is setup, a new bootstrap code is preferably installed on the user's workstation. The role of the bootstrap code is to request information from the user to setup the TL1 tunnel, before the CTC bootstrap can start.

A user may use a graphical user interface (GUI) at the transport manager 14 to pre-establish the TL1 tunnel 40. The user may also add a new TL1 tunnel 40 from the GUI interface during a transport controller session. If the tunnel 40 goes down, the system is preferably configured such that the tunnel is automatically reconfigured and the user notified about the condition.

Figure 15:
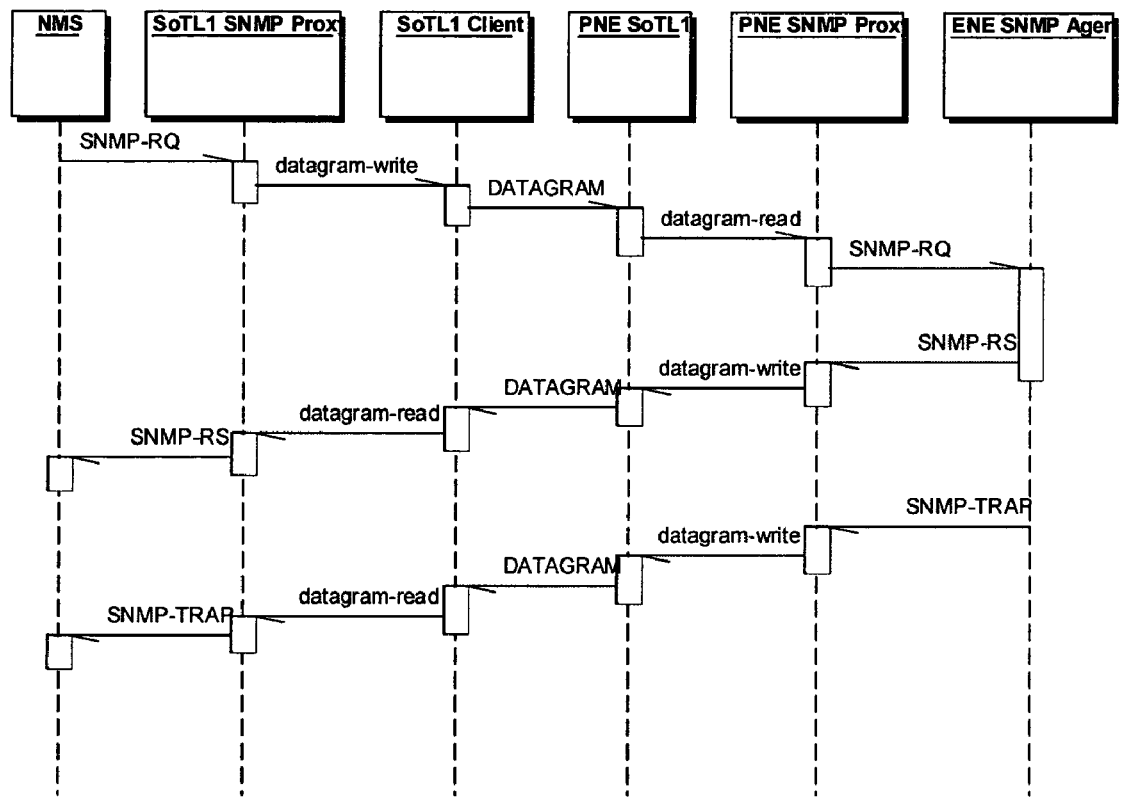
FIG. 15 illustrates SNMP support for Socket over TL1.

In one embodiment, SNMP traffic is supported by SoTL1 with the use of an SNMP proxy server (referred to as SoTL1 SNMP proxy server). The proxy server may be, for example, a Java program. The proxy server is used to open the TL1 tunnels and forward SNMP traffic on top of the PNE SNMP proxy using the same mechanism as the ONS SNMP proxy. The SNMP proxy preferably uses the community field to encode the path to the target ENE. As shown in FIG. 15, the use of an extra SNMP proxy server results in one additional hop towards the target ENE. SNMP traps are handled by specifying the return path under the same format. The SoTL1 SNMP proxy server is used to service all ENEs that are located behind the SoTL1 tunnels. A new DATAGRAM PDU is used to support the remoting of UDP (socket datagram) service (FIG. 15). The DATAGRAM PDU is preferably channel-less and can be sent both ways over the tunnel.

Possible optimizations to the SoTL1 described above include on-the-fly compression/decompression of the TCP stream to boost throughput or pooling of multiple PDUs into the same TL1 PDU on the TL1/OSI side to relieve the OSI upper layers flow control.

IP Over TL1

Figure 16:
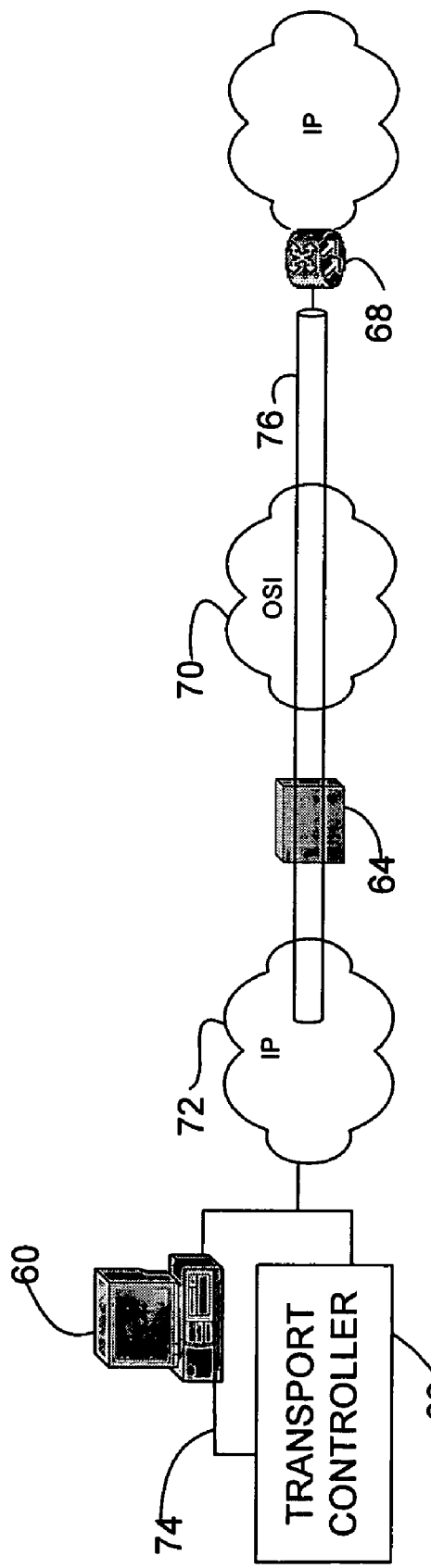
FIG. 16 illustrates IP over TL1.

The introduction of the IP relay over TL1 allows all IP aware management applications to talk to network elements that are behind the OSI network. FIG. 16 illustrates the transfer of IP over TL1 between a workstation 60 on a management network and a first network element (PNE) 68 located behind a second network element (competitor network element or OEM-Gateway network element (GNE)) 64. The workstation 60 is configured to transfer TCP/IP and TL1 data and has a transport controller application (e.g., CTC) 62 installed thereon, or is in communication with a computer running the transport controller application via the transfer of TCP/IP packets over link 74. The workstation 60 is in communication with GNE 64 which is not compatible with (i.e., cannot communicate directly with) the transport controller 62. Network elements 64 and 68 communicate over an OSI network 70. GNE 64 communicates with the workstation 60 over IP network 72. GNE 64 only talks OSI over connecting links, but it has TCP/IP access to a LAN to access products within the LAN and also access their TL1 interfaces. IPoTL1 does not require any modification to GNE 64, which is already configured for TL1 message transfer.

Figure 17:
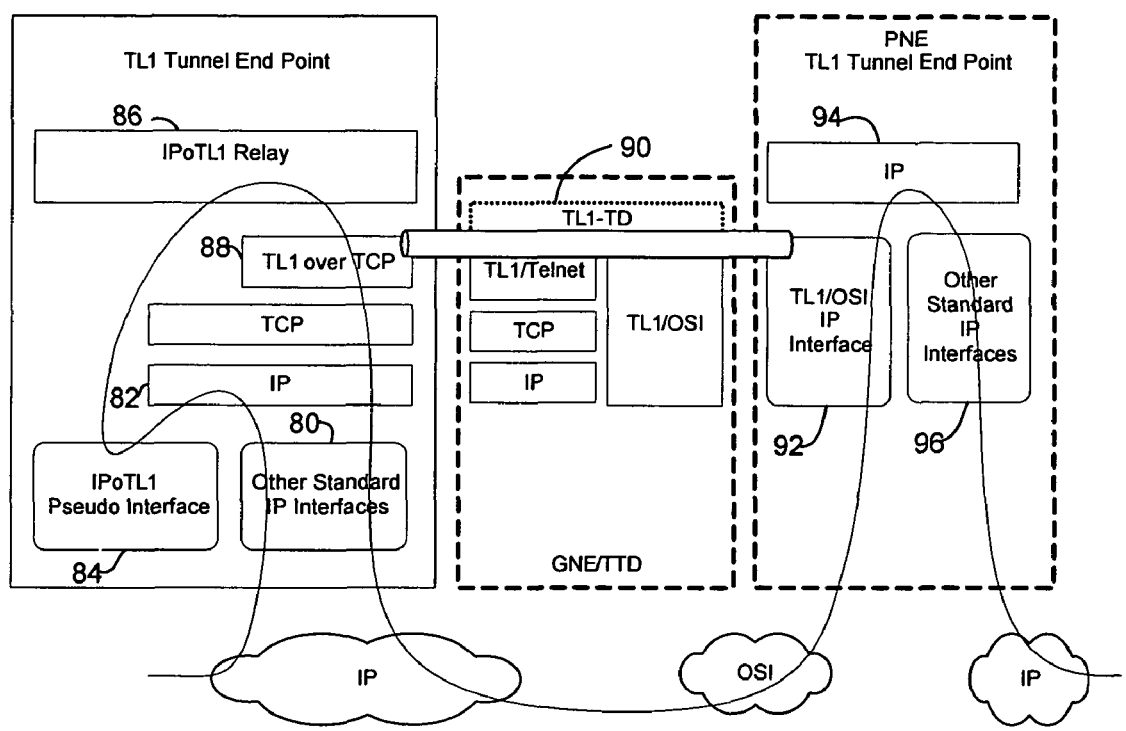
FIG. 17 illustrates a process for transferring IP over TL1.

FIG. 17 illustrates a process for transferring IP over TL1. An IP packet to be sent to the Network Elements that are located behind the OSI network is first routed to a tunnel end point and arrives to through a standard IP interface 80. The packet reaches the IP router 82 then is routed (through static route) to a pseudo-interface 84. The pseudo-interface forwards the packet to a local relay 86. The relay has a table that maps destination IP addresses to a TL1 tunnel address. The TL1 tunnel is established (if it has not been opened already) and the IP packet is encoded in a specific TL1 command 88. The IP packets are preferably encoded using base64 so that the characters are printable and are permeable through TL1. The TL1 command is then sent to the remote tunnel end point through the GNE 90. On the PNE, the local OSI stack 92 intercepts all TL1 connections that contain these specific TL1 commands, extracts the IP packet, and injects them into the local IP router 94. The IP router views the OSI stack as an IP interface. This special IP interface can support multiple TL1 tunnels if necessary. The IP packet is then routed as usual either to the local application or to a remote address.

In the reverse direction, IP packets sent to the remote tunnel end point are routed to the local OSI stack 92 using static routes. The OSI stack will then be able to encode the IP packet into a specific TL1 autonomous message (using base64 encoding) and forward it to the appropriate TL1 tunnel (based on the destination IP). It should be noted that some implementations may choose to define one static IP interface per (potential) TL1 tunnel so that all routing decisions are performed in the IP router 92, while other implementations may define a single pseudo interface (or virtual interface) for all tunnels (this will require a second level of routing inside the pseudo interface).

The TL1 tunnel is terminated at the discretion of either tunnel end point, typically after the expiration of an IP-level idle timer.

Because the TL1 tunnel is connection oriented and regulated by a flow control, each tunnel end point might choose to implement procedures to handle flow control, for example, by managing a send queue and sending back ICMP source quench messages when the queue reaches a certain level. After a certain threshold is reached, IP packets are dropped (in which case it is the responsibility of higher layers to cope with the loss of packets).

GIOP Over TL1

Figure 18:
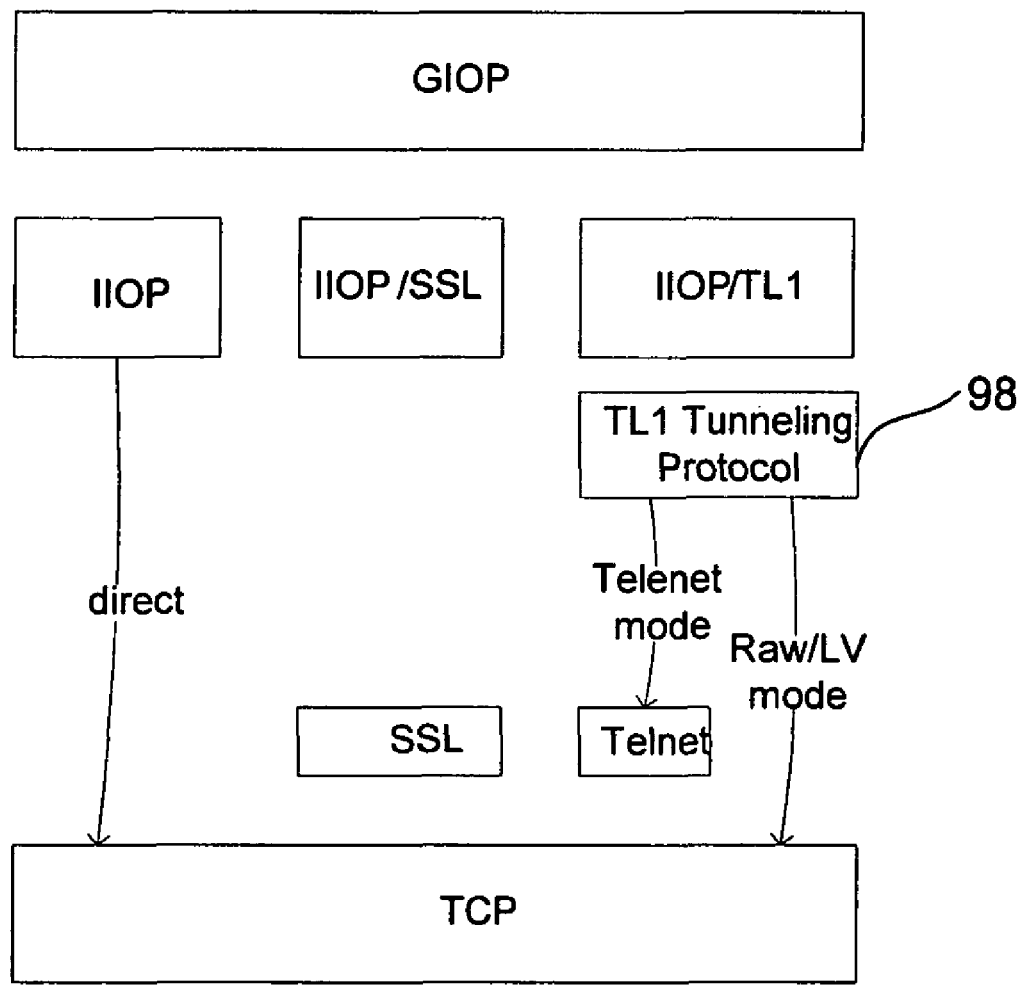
FIG. 18 illustrates GIOP over TL1.

The CORBA architecture is based on a General Inter-ORB Protocol (GIOP) which is independent of the transport used. The protocol supports multiple transports, the most common being IIOP (based on TCP/IP) and SSL-IIOP (based on the Secure Socket Layer). The only requirement is that the transport used must be similar to the TCP transport (stream based or message based and guarantees delivery of content and order). As shown in FIG. 18, a new transport 98 based on the TL1 connection is inserted into the transport stream.

Figure 19:
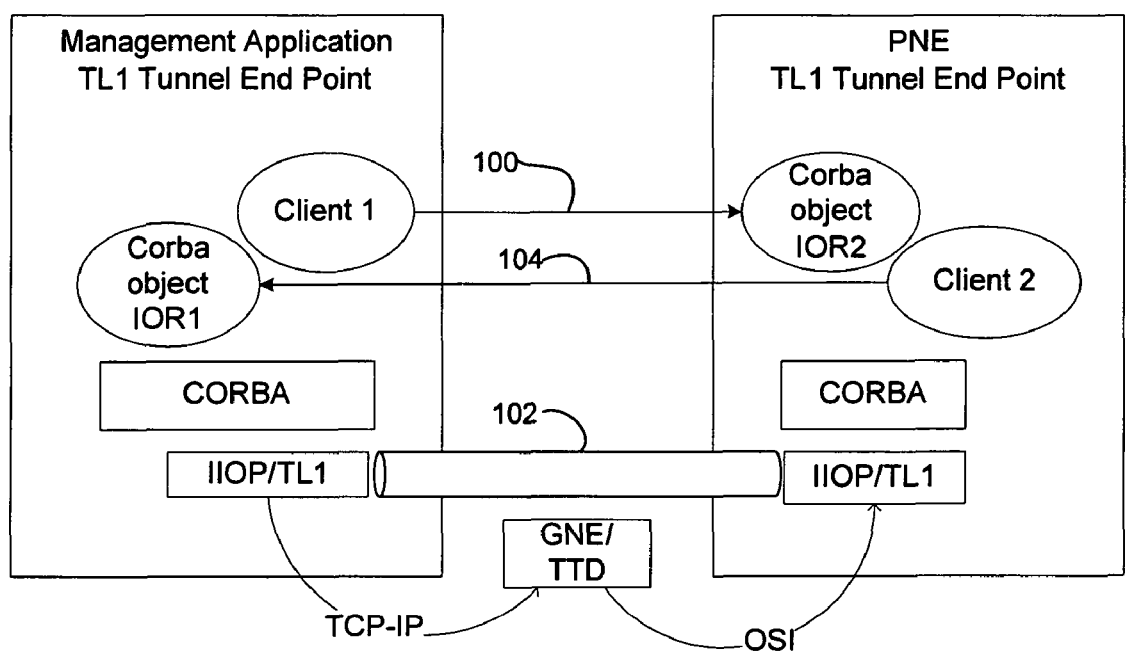
FIG. 19 illustrates connectivity between applications for GIOP over TL1.

FIG. 19 shows the connectivity between applications running on the transport manager and CORBA objects located in the GNE using the GIOP over TL1 transport. Client 1 is an application that manages Network Elements that reside behind an OSI network 100. To connect and interact with a CORBA object that resides on those Network Elements, Client 1 needs to get its CORBA address which is called IOR (Inter-operable Object Reference). This can be done using static tables or using other external services such as directory services. The IOR contains information that identifies the CORBA object and allows it to find a route to reach that object. In the case of IIOP, the IOR contains the IP address of the system where the CORBA object resides. In the case of GIOP over TL1, it can contain the OSI NSAP address of the system where the CORBA object resides.

Once the IOR is known, a local function must find how to reach the OSI NSAP (Network Service Address Point) address, for example, with a lookup table that maps NSAP addresses to GNEs to use. This information will then allow to open the TL1 tunnel 102 to the PNE. Once the tunnel is established, GIOP messages are exchanged using similar encoding schemes as SoTL1 or IPoTL1. Upon receiving the specific TL1 command, the GIOP message is decoded and then sent to the PNE ORB which forwards the message to the corresponding CORBA object for execution. Replies to CORBA operations follow the reverse path back to the client.

CORBA operations that are initiated on the PNE 104 will need to reuse the same TL1 tunnel because TL1 tunnels can only be established one way. This reuse requires the use of the bidirectional GIOP feature. This limitation implies that management actions can only be initiated from the TCP-IP network, which is in general not an issue.

Similar to SoTL1, a distinct TL1 tunnel is established between each pair of management application/Network Element and there is no flow control issue (similar to the one found in the IP over TL1 solution).

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing network management communication between a transport manager and a plurality of network elements, the method comprising:
    creating a tunnel configured for transmitting data between the transport manager and said plurality of network elements, the tunnel passing through a gateway network element configured to communicate with the transport manager and said plurality of network elements utilizing a network management protocol, wherein creating a tunnel comprises initiating at the transport manager, communication between the gateway network element and one of the network elements to open the tunnel, and wherein one end of the tunnel is at a proxy network element and the other end of the tunnel is at the transport manager;
    creating a socket interface at each end of the tunnel;
    opening multiple flow controlled channels over the tunnel;
    multiplexing said channels into a single connection at each end of the tunnel; and
    transmitting network management information over one or more of said channels utilizing said network management protocol;
    wherein the transport manager is an IP (Internet Protocol) device in a first IP network in communication with the gateway network element, the tunnel connecting the first IP network to a second IP network.

2. The method of claim 1 wherein transmitting network management information comprises transmitting IP packets over the tunnel.

3. The method of claim 1 wherein said network management protocol is Transaction Language 1.

4. The method of claim 1 further comprising encapsulating data before transmitting the network management information.

5. The method of claim 1 further comprising tunneling socket connections.

6. The method of claim 5 further comprising forwarding SNMP (Simple Network Management Protocol) traffic to one or more end point network elements utilizing a proxy server.

7. The method of claim 1 further comprising trapping IP packets addressed to one or more of said network elements in communication with the tunnel.

8. The method of claim 1 further comprising encoding the packets before transmitting the packets over the tunnel.

9. The method of claim 1 wherein transmitting network management information comprises transmitting information over an OSI (Open Systems Interconnection) application layer.

10. The method of claim 9 wherein transmitting network management information comprises utilizing General Inter-ORB (Object Request Broker) protocol.

11. A computer readable non-transitory media storage medium storing computer executable instructions for providing network management communication between a transport manager and a plurality of network elements, the instructions comprising:
    code that creates a tunnel configured for transmitting data between the transport manager and said plurality of network elements, the tunnel passing through a gateway network element configured to communicate with the transport manager and said plurality of network elements utilizing a network management protocol, wherein creating a tunnel comprises initiating at the transport manager, communication between the gateway network element and one of the network elements to open the tunnel, and wherein one end of the tunnel is at a proxy network element and the other end of the tunnel is at the transport manager;

code that creates a socket interface at each end of the tunnel;

code that open multiple flow controlled channels over the tunnel;

code that multiplexes said channels into a single connection at each end of the tunnel; and code that transmits network management information over the one or more of said channels utilizing said network management protocol wherein the transport manager is an IP (Internet Protocol) device in a first IP network in communication with the gateway network element, the tunnel connecting the first IP network to a second IP network.

12. The computer readable storage medium of claim 11 wherein code that transmits network management information comprises code that transmits IP packets over the tunnel.

13. The computer readable storage medium of claim 11 wherein transmitting network management information comprises transmitting information over an OSI (Open Systems Interconnection) application layer.

14. The computer readable storage medium of claim 13 wherein transmitting network management information comprises utilizing General Inter-ORB (Object Request Broker) protocol.

15. A system for transmitting network management information between a transport manager and a proxy network element communicating via a gateway network element, the network elements configured to communicate utilizing a network management protocol, the system comprising:

a transport controller configured to create a tunnel having one end point at the transport manager and the other end point at the proxy network element, the tunnel passing through the gateway network element and having network management protocol connections comprising a socket interface at each end thereof, wherein the tunnel operates at a transport layer and comprises a socket TCP (Transmission Control Protocol) interface, and the transport manager is configured to send IP packets over the tunnel utilizing said network management protocol;

wherein the transport manager is an IP (Internet Protocol) device in a first IP network in communication with the gateway network element, the tunnel connecting the first IP network to a second IP network.

16. An apparatus for providing network management communication between a transport manager and a plurality of network elements, comprising:

means for creating a tunnel configured for transmitting data between the transport manager and said network elements, the tunnel passing through a gateway network element configured to communicate with said plurality of network elements utilizing a network management protocol, wherein means for creating a tunnel comprises means for initiating at the transport manager, communication between the gateway network element and one of the network elements to open the tunnel, and wherein one end of the tunnel is at a proxy network element and the other end of the tunnel is at the transport manager;

means for creating a socket interface at each end of the tunnel;

means for opening multiple flow controlled channels over the tunnel;

means for multiplexing said channels into a single connection at each end of the tunnel; and means for transmitting network management information over one or more of said channels utilizing said network management protocol;

wherein the transport manager is an IP (Internet Protocol) device in a first IP network in communication with the gateway network element, the tunnel connecting the first IP network to a second IP network.

17. The apparatus of claim 16 wherein means for transmitting network management information comprises means for transmitting information over an OSI (Open Systems Interconnection) application layer utilizing General Inter-ORB (Object Request Broker) protocol.

18. The system of claim 15 wherein the transport controller is configured for flow control.

19. The apparatus of claim 16 wherein said network management protocol is Transaction Language 1.

20. The method of claim 1 wherein transmitting network management information over the tunnel comprises transmitting network management information at an OSI (Open Systems Interconnection) transport layer and wherein the connection at the transport manager end of the tunnel comprises a socket TCP (Transmission Control Protocol) interface.

21. The method of claim 20 further comprising multiplexing a plurality of TCP (Transmission Control Protocol) connections into a TL1 (Transmission Language 1) connection at one end of the tunnel.

* * * * *